United States Patent
Drumm et al.

(10) Patent No.: US 9,106,878 B2
(45) Date of Patent: Aug. 11, 2015

(54) METHOD AND DEVICE FOR ADJUSTING THE COLOR POINT OF A LIGHTING UNIT

(75) Inventors: Jan Oliver Drumm, Homburg (DE); Jens Richter, Lappersdorf (DE); Claus Seibert, Regensburg (DE)

(73) Assignee: OSRAM Gesellschaft mit beschraenkter Haftung, Munich (DE)

( * ) Notice: Subject to any disclaimer, the term of this patent is extended or adjusted under 35 U.S.C. 154(b) by 741 days.

(21) Appl. No.: 13/131,636

(22) PCT Filed: Nov. 6, 2009

(86) PCT No.: PCT/EP2009/064739
§ 371 (c)(1),
(2), (4) Date: Aug. 3, 2011

(87) PCT Pub. No.: WO2010/060775
PCT Pub. Date: Jun. 3, 2010

(65) Prior Publication Data
US 2011/0279494 A1    Nov. 17, 2011

(30) Foreign Application Priority Data

Nov. 28, 2008   (DE) .......................... 10 2008 059 639

(51) Int. Cl.
  *G09G 5/02*   (2006.01)
  *H04N 9/73*   (2006.01)
  *H04N 9/31*   (2006.01)

(52) U.S. Cl.
  CPC .............. *H04N 9/73* (2013.01); *H04N 9/3129* (2013.01); *H04N 9/3161* (2013.01)

(58) Field of Classification Search
  USPC .......................... 345/518, 690, 168; 715/864
  See application file for complete search history.

(56) References Cited

U.S. PATENT DOCUMENTS

| | | | |
|---|---|---|---|
| 5,221,920 A * | 6/1993 | Poynter .......................... | 345/591 |
| 6,252,636 B1 | 6/2001 | Bartlett | |
| 6,770,864 B2 * | 8/2004 | Yan ............................. | 250/221 |
| 2004/0135750 A1 | 7/2004 | Ishiguchi | |
| 2006/0132403 A1 | 6/2006 | Maximus et al. | |
| 2006/0209029 A1 * | 9/2006 | Gutbrod et al. ............... | 345/168 |
| 2006/0255243 A1 | 11/2006 | Kobayashi et al. | |
| 2006/0262147 A1 * | 11/2006 | Kimpe et al. .................. | 345/690 |
| 2007/0035707 A1 * | 2/2007 | Margulis ....................... | 353/122 |
| 2007/0138372 A1 | 6/2007 | Klosowiak et al. | |
| 2007/0152129 A1 * | 7/2007 | Li et al. ...................... | 250/201.3 |
| 2008/0062161 A1 | 3/2008 | Brown et al. | |
| 2008/0144183 A1 | 6/2008 | Zhang et al. | |

FOREIGN PATENT DOCUMENTS

WO    2007076184 A2    7/2007

OTHER PUBLICATIONS

International Search Report of PCT/EP2009/064739 dated Feb. 16, 2010.

* cited by examiner

*Primary Examiner* — Charles V Hicks
*Assistant Examiner* — Jeffrey Steinberg (57) ABSTRACT

A method for adjusting the color point of a lighting unit including semiconductor-based lasers for generating an RGB signal. The method may include supplying at least one component of the RGB signal to a sensor via a filter; and actuating at least one of the semiconductor-based lasers by means of a signal detected by the sensor.

13 Claims, 6 Drawing Sheets

Equation 101:

$$[w] = \begin{bmatrix} Xw \\ Yw \\ Zw \end{bmatrix}$$

Equation 102:

$$[R] = \begin{bmatrix} XR(\lambda\_R(T)) \\ YR(\lambda\_R(T)) \\ ZR(\lambda\_R(T)) \end{bmatrix} \quad [G] = \begin{bmatrix} XG(\lambda\_G(T)) \\ YG(\lambda\_G(T)) \\ ZG(\lambda\_G(T)) \end{bmatrix} \quad [B] = \begin{bmatrix} XB(\lambda\_B(T)) \\ YB(\lambda\_B(T)) \\ ZB(\lambda\_G(T)) \end{bmatrix}$$

Equation 103:

$$[w] = \begin{bmatrix} Xw \\ Yw \\ Zw \end{bmatrix} = P\_R(\lambda\_R(T)) * \begin{bmatrix} XR(\lambda\_R(T)) \\ YR(\lambda\_R(T)) \\ ZR(\lambda\_R(T)) \end{bmatrix} + P\_G(\lambda\_G(T)) * \begin{bmatrix} XG(\lambda\_G(T)) \\ YG(\lambda\_G(T)) \\ ZG(\lambda\_G(T)) \end{bmatrix} + P\_B(\lambda\_B(T)) * \begin{bmatrix} XB(\lambda\_B(T)) \\ YB(\lambda\_B(T)) \\ ZB(\lambda\_G(T)) \end{bmatrix}$$

$$\Leftrightarrow \begin{bmatrix} Xw \\ Yw \\ Zw \end{bmatrix} = \begin{bmatrix} XR(\lambda\_R(T)) & XG(\lambda\_G(T)) & XB(\lambda\_B(T)) \\ YR(\lambda\_R(T)) & YG(\lambda\_G(T)) & YB(\lambda\_B(T)) \\ ZR(\lambda\_R(T)) & ZG(\lambda\_G(T)) & ZB(\lambda\_G(T)) \end{bmatrix} * \begin{bmatrix} P\_R(\lambda\_R(T)) \\ P\_G(\lambda\_G(T)) \\ P\_B(\lambda\_B(T)) \end{bmatrix} = \text{const.}$$

Equation 104:
$$XR(\lambda\_R(T)) = \bar{x}(\lambda\_R(T))$$
$$YR(\lambda\_G(T)) = \bar{y}(\lambda\_G(T))$$
$$ZR(\lambda\_B(T)) = \bar{z}(\lambda\_B(T))$$

FIG 3

Equation 105:

$$\begin{bmatrix} P\_R(\lambda\_R(T)) \\ P\_G(\lambda\_G(T)) \\ P\_B(\lambda\_B(T)) \end{bmatrix} = \begin{bmatrix} XR(\lambda\_R(T)) & XG(\lambda\_G(T)) & XB(\lambda\_B(T)) \\ YR(\lambda\_R(T)) & YG(\lambda\_G(T)) & YB(\lambda\_B(T)) \\ ZR(\lambda\_R(T)) & ZG(\lambda\_G(T)) & ZB(\lambda\_G(T)) \end{bmatrix}^{-1} * \begin{bmatrix} Xw \\ Yw \\ Zw \end{bmatrix}$$

$$= \frac{\begin{bmatrix} YG*ZB-YB*ZG & XB*ZG-XG*ZB & XG*YB-XB*ZB \\ YB*ZR-YR*ZB & XR*ZB-XB*ZR & XB*YR-XR*YB \\ YR*ZG-YG*ZR & XG*ZR-XR*ZG & XR*YG-XG*YR \end{bmatrix}}{\det\left(\begin{bmatrix} XR & XG & XB \\ YR & YG & YB \\ ZR & ZG & ZB \end{bmatrix}\right)} * \begin{bmatrix} TX\_w \\ TY\_w \\ TZ\_w \end{bmatrix}$$

$$= \frac{\begin{bmatrix} YG*ZB-YB*ZG & XB*ZG-XG*ZB & XG*YB-XB*ZB \\ YB*ZR-YR*ZB & XR*ZB-XB*ZR & XB*YR-XR*YB \\ YR*ZG-YG*ZR & XG*ZR-XR*ZG & XR*YG-XG*YR \end{bmatrix}}{XR*(YG*ZB-YB*ZG)-YR*(XG*ZB-XB*ZG)+ZR*(XG*YB-XB*YG)} * \begin{bmatrix} TX\_w \\ TY\_w \\ TZ\_w \end{bmatrix}$$

FIG 4

Equation 106:

$$f\_R(\lambda\_R(T)) = \frac{S\_R(Tcal)}{P\_R(\lambda\_R(T))}$$

$$f\_G(\lambda\_G(T)) = \frac{S\_G(Tcal)}{P\_G(\lambda\_G(T))}$$

$$f\_B(\lambda\_B(T)) = \frac{S\_B(Tcal)}{P\_B(\lambda\_B(T))}$$

Equation 107:

$$S\_R(T) = P\_R*f\_R(\lambda\_R(T))$$
$$S\_G(T) = P\_G*f\_G(\lambda\_G(T))$$
$$S\_B(T) = P\_B*f\_B(\lambda\_B(T))$$

Equation 107:

$$T(\lambda) = \begin{cases} Tr0\_R*(1-(\lambda-\lambda\_R\_0)*s) \\ Tr0\_G \\ Tr0\_B \end{cases} \text{ für } \begin{cases} \lambda \in [635, 655] \text{ nm} \\ \lambda \in [528, 533] \text{ nm} \\ \lambda \in [440, 457] \text{ nm} \end{cases}$$

FIG 11

METHOD AND DEVICE FOR ADJUSTING THE COLOR POINT OF A LIGHTING UNIT

RELATED APPLICATIONS

The present application is a national stage entry according to 35 U.S.C. §371 of PCT application No.: PCT/EP2009/064739 filed on Nov. 6, 2009, which claims priority from German application No.: 10 2008 059 639.6 filed on Nov. 28, 2008.

TECHNICAL FIELD

Various embodiments relate to a method and device for adjusting the color point of a lighting unit.

BACKGROUND

With an RGB laser module for so-called embedded projection applications, semiconductor-based laser beam sources (laser sources or lasers) are used for light generation. The optical output performance of the laser source is thereby often dependent on the temperature. The emitted wavelength of the laser source can also be influenced by the temperature.

These two temperature dependencies lead to significant changes of a mixed color generated by means of several laser sources with the operation of the RGB laser module with different ambient temperatures and thus prevent a color-true reproduction of image information for example of a RGB laser projector.

SUMMARY

Various embodiments avoid the above-mentioned disadvantages and enable e.g. a comparatively color-true reproduction of image information, wherein the image information is achieved by the mixture of different light sources, at least of a semiconductor-based light source.

Various embodiments provide a method for adjusting the color point of a lighting unit, wherein the lighting unit has semiconductor-based lasers for generating a RGB signal. At least one component of the RGB signal, e.g. a light beam originating from a semiconductor-based laser, is supplied to a sensor via a filter and at least one of the semiconductor-based lasers is actuated by means of the signal detected by the sensor.

It should be noted hereby that the adjusting of the color point may include a color point adjustment or a continuous or iterative control of an adjusted color point. The method may particularly be used as a regulation method for the continuous or time-discrete adjustment or control of the color point.

It should further be noted that semiconductor-based laser sources may be used. Light diodes of different colors and/or semiconductor lasers may be used as light sources.

It should also be noted that the component of the RGB signal may include a light beam of the red semiconductor-based laser, the green semiconductor-based laser and/or the blue semiconductor-based laser.

The filter may particularly be an optical filter.

One advantage of the suggested solution consists in that an efficient and application-dependant scalable possibility of the adjustment or for adjusting the color point is created. The color point may particularly be an illuminant, e.g. "D65".

The introduced approach enables the reduction or compensation of a drifting of the color point particularly in dependence on the temperature. Wavelength drifts or performance drifts of the semiconductor-based lasers may thus be compensated effectively while maintaining a color point appearing in an essentially stable manner.

A further development is that several semiconductor-based lasers are actuated sequentially by means of the respectively associated detected signal.

For example, the signal detected by the sensor, e.g. by a photo diode, may be read out by a regulation or by an actuation electronic system (which may for example be realized in the form of an ASIC) and the performance of the corresponding laser may be adapted. The processing in these time slots (e.g. respectively one time slot for the actuation of a laser) is correspondingly efficient when using only one sensor for all components of the RGB signal, that is, is possible for all light beams of the semiconductor-based lasers.

It is also a possibility that all components of the RGB signal are supplied to the sensor via the filter.

Another further development is that several components of the RGB signal are supplied to a respective sensor and that the at least one semiconductor-based sensor is actuated by means of the signal detected by the respective sensor.

It is particularly a further development that several filters are provided for several components of the RGB signal.

In particular, at least one filter can be provided per component or light beam of the RGB signal.

It is also a further development that the sensor includes a photo diode, wherein the photo diode is particularly arranged in the proximity of a laser rear facet.

It is furthermore a further development that a regulation for the actuation of the at least one semiconductor-based is provided.

This regulation may be realized in the form of a computer. The regulation may particularly include hardware and/or software components. The regulation may for example be realized in the form of an ASIC.

Within the scope of an additional further development, the adjusting of the color point comprises an adjusting of an illuminant or an illuminant setting or an illuminant regulation.

A next further development consists in that the adjusting of the color point takes place within the scope of a given tolerance, wherein the given tolerance is determined particularly by means of a MacAdams distance.

In one embodiment, the lighting unit includes a red semiconductor-based laser, a green semiconductor-based laser and a blue semiconductor-based laser.

In an alternative embodiment, the green semiconductor-based laser is an optically or electrically pumped infrared semiconductor laser particularly with frequency doubling.

This may hereby be a frequency doubling within the resonator (inter cavity frequency doubling) or a frequency doubling outside the resonator (extra cavity frequency doubling).

A next embodiment is that the filter includes one of the following filters:
  a V lambda filter;
  an absorption filter;
  a transmission filter.

An arrangement is also possible where the filter is designed in such a manner that at least one further dependency of a color location on a wavelength of at least another light source is considered.

It is thus possible that the wavelength change over the temperature is considered with only one single filter, wherein the filter may be arranged only in a beam path of a laser. The signal detected by means of the filter by the sensor thus does not only permit conclusions regarding the wavelength drift of the current light beam, but also regarding the wavelength drift of a further light beam (not sensed by the filter). This is e.g.

possible in that the correlation between wavelength drifts is determined within the scope of the evaluation and several semiconductor-based lasers are adjusted in dependence on the result.

A brightness change with a changeable temperature may correspondingly be determined and (at least partially) be compensated.

A further development consists in that the semiconductor-based laser includes a laser diode.

It is also a further development that the filter is designed for a preset wavelength range, particularly in a visible spectrum.

The filter may thus advantageously be designed for a certain wavelength range of a light beam or of a component of the RGB signal. This enables a simplified and cost-efficient production of the filter.

Furthermore, a device for adjusting the color point of a lighting unit is suggested for achieving the above-mentioned object with semiconductor-based lasers for generating an RGB signal, with at least one filter via which at least one component of the RGB signal may be supplied to at least one sensor, with a regulation which actuates at least one of the semiconductor-based lasers by means of a signal detected by the sensor.

Various embodiments provide a device which includes a processor unit and/or an at least partially wired or logical circuit arrangement, which is designed in such a manner that the method may be carried out as described here.

The said processor unit may be or include any type of processor or computer or computer with a correspondingly necessary periphery (store, input/output interfaces, input-output devices, etc.).

A wired or a logical circuit unit, e.g. a FPGA or an ASIC or another integrated circuit may furthermore be e.g. provided as actuation or regulation.

The device may thus particularly include a unit for the parallel processing of signals and/or a unit for the serial processing of signals.

BRIEF DESCRIPTION OF THE DRAWINGS

Exemplary embodiments of the invention are shown and explained in the following by means of the drawings.

Wherein.

DETAILED DESCRIPTION

The following detailed description refers to the accompanying drawings that show, by way of illustration, specific details and embodiments in which the invention may be practiced.

The approach proposed here enables a (virtually) constant illuminant by means of an adjustment or regulation of a performance of at least one semiconductor-based laser source. The performance may particularly be adjusted separately for several semiconductor-based laser sources.

A product of the performance of the semiconductor-based laser source (called "laser" in the following) and a filter function derived from the colorimetry may thereby be kept constant as the regulation variable. This may particularly take place (e.g. independently) for several light sources of the RGB module.

The filter function thereby considers a temperature dependence of the wavelength and a necessary adaptation of the optical output performance of the laser resulting therefrom, so that a stable illuminant may be achieved. It should be noted hereby that a stable or constant illuminant is e.g. an illuminant with a preset tolerance, e.g. an illuminant within a predetermined deviation. Such a tolerance may particularly be given in a product-specific manner.

The form of the filter function is derived from a so-called illuminant stability equation.

It is for example possible to provide respectively one regulator circuit for the three colors red, green and blue as follows:

$$S\_R(T)=P\_R*f\_R(\lambda\_R(T))$$

$$S\_G(T)=P\_G*f\_G(\lambda\_G(T))$$

$$S\_B(T)=P\_B*f\_B(\lambda\_B(T))$$

Whereby:

S_R(T), S_G(T), S_B(T) designate regulation variables

P_R, P_G, P_B designate optical output performances of the respective RGB lasers as actuating variables $\lambda\_R(T)$, $\lambda\_G(T)$, $\lambda\_B(T)$ designate temperature-dependent wavelengths of the RGB lasers.

The regulator circuits adjust the actuating variables P_R, P_G, P_B in such a manner that the regulation variables S_R(T), S_G(T), S_B(T) are kept in a stable manner at the values S_R(Tcal)

S_G (Tcal)

S_B(Tcal).

These values S_R(Tcal), S_G(Tcal), S_B(Tcal) can be determined at a temperature Tcal by means of a calibration.

The optical output performances P_R, P_G, P_B may thus be adjusted in such a manner that a given illuminant [w] (e.g. "D65") and a given light flow L are achieved.

The filter functions $f\_R(\lambda\_R(T))$, $f\_G(\lambda\_G(T))$, $f\_B(\lambda\_B(T))$ may for example be realized in the form of an optical filter, e.g. as a transmission filter.

In the following, a possibility for the filter functions $f\_R(\lambda\_R(T))$, $f\_G(\lambda\_G(T))$, $f\_B(\lambda\_B(T))$ is explained in an exemplary manner. Colorimetric formulas relate in an exemplary manner to the CIE 1931 standard ("CIE standard valence system").

Figure 1:
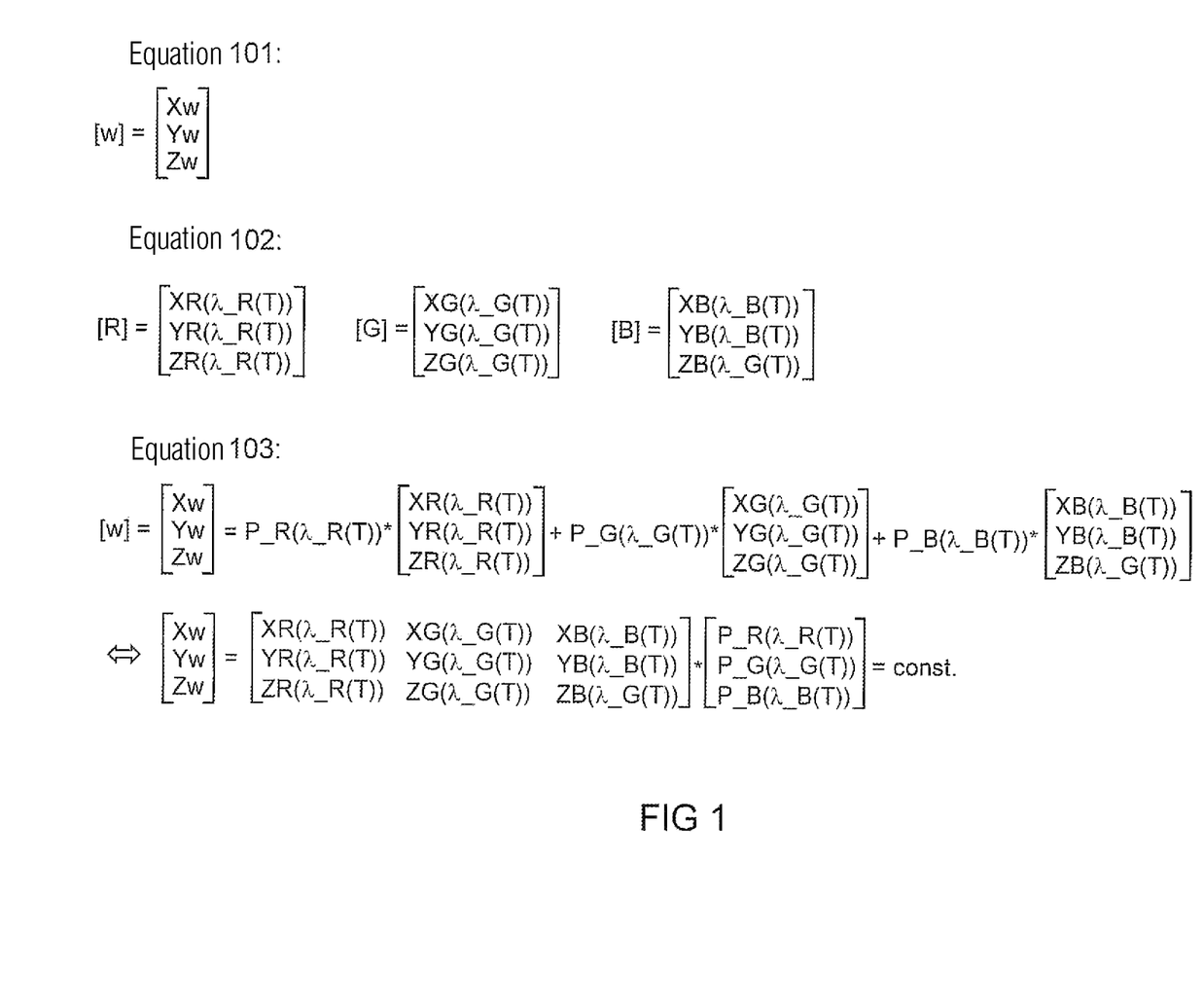
FIG. 1 shows an equation for describing an illuminant [w], an equation 102 for describing the colors red, green, blue and an illuminant stability equation 103.

For generating a constant illuminant [w] according to equation 101 (see FIG. 1), with the tristimulus values Xw, Yw, Zw, three laser beams with the colors red [R], green [G] and blue [B] according to equation 102 (see FIG. 1) and the radiometric performances $P\_R(\lambda\_R(T))$, $P\_G(\lambda\_G(T))$, $P\_B(\lambda\_B(T))$ are superposed to equation 103 (FIG. 1). Equation 103 is also called "illuminant stability equation" in the following.

Figure 2:
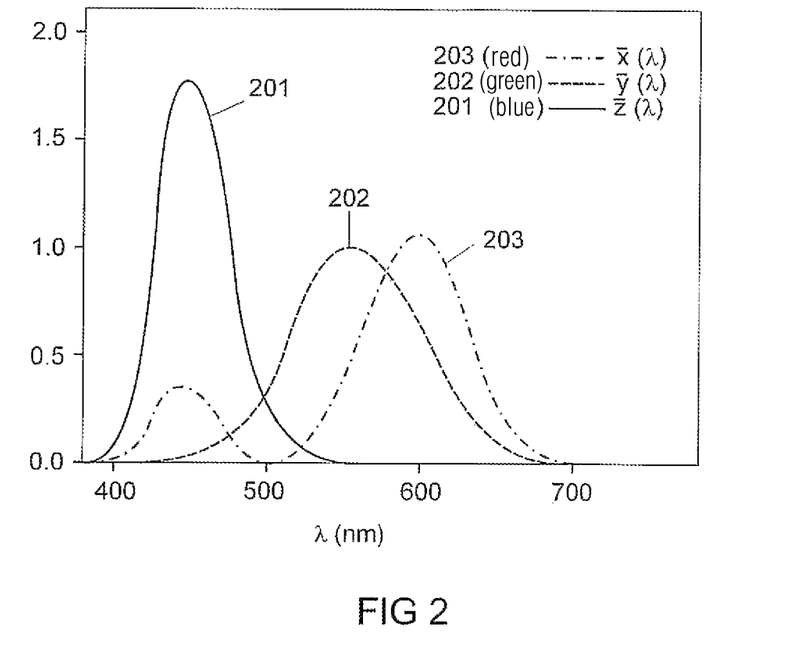
FIG. 2 shows dependencies of tristimulus values of the RGB lasers in dependence on the wavelength in the form of so-called "color matching functions"

FIG. 2 shows dependencies of tristimulus values of the RGB lasers in dependence on the wavelength as so-called "color matching functions" 201 to 203 according to CIE 1931.

Figure 3:
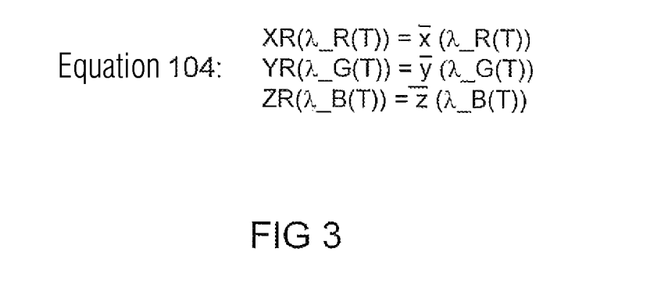
FIG. 3 shows an equation 104 for illustrating the connection of the tristimulus values of the RGB lasers with the wavelengths.

The tristimulus values of the RGB lasers can correspondingly be combined with the wavelengths $\lambda\_R(T)$, $\lambda\_G(T)$, $\lambda\_B(T)$ according to equation 104.

Figure 4:
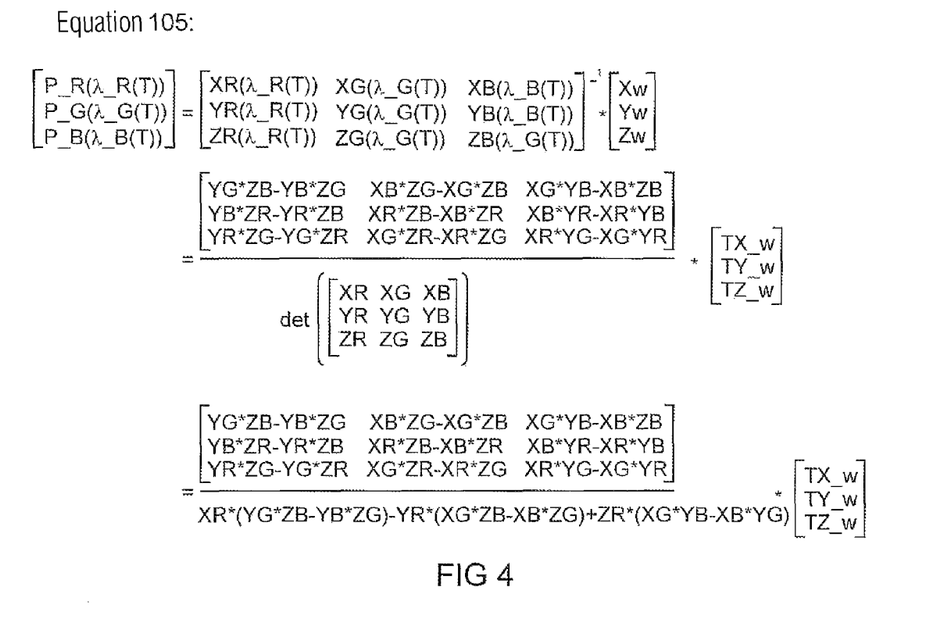
FIG. 4 shows an equation 105 for solving the illumination stability equation 103.

The above-described illuminant stability equation may be solved according to the radiometric performances according to equation 105 (see FIG. 4). For a clearer representation, an explicit representation of the wavelength and temperature dependencies was foregone with the conversion.

The illuminant stability equation 105 may be interpreted as follows: if the radiometric performances $P\_R(\lambda\_R(T))$, $P\_\_G(\lambda\_G(T))$, $P\_B(\lambda\_B(T))$ are adjusted according to the above direction, the illuminant [w] is also kept stable with wavelength fluctuations dependent on temperature.

Figure 5:
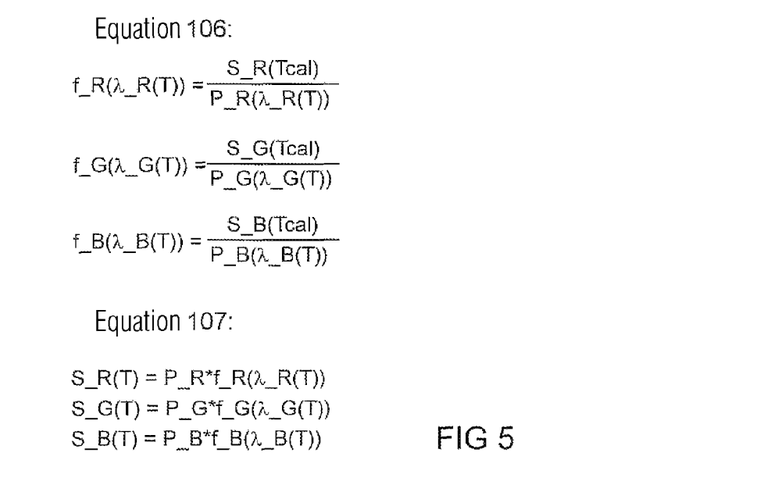
FIG. 5 shows an equation 106 including filter functions and an equation 107 for representing the regulator circuits.

By means of the filter functions $f\_R(\lambda\_R(T))$, $f\_G(\lambda\_G(T))$, $f\_B(\lambda\_B(T))$ shown in equation 106, the RGB performance values resulting from the illuminant stability equation can be determined for the performance regulation.

The filter functions according to equation 106 may thus be used in the regulator circuits according to equation 107 (see FIG. 5). The respective regulator circuit may thereby provide a temperature-dependent or a wavelength-dependent performance of at least one laser according to the illuminant stability equation.

It is correspondingly possible that the approach present here provides at least one regulator circuit, especially an inherent one for each laser, which respectively converts at least one filter function corresponding to equation 106 and thus reduces or compensates temperature fluctuations in an effective manner and enables an essentially stable illuminant.

Within the scope of an advantageous embodiment, an initially adjusted illuminant (e.g. "D65") may be kept stable independently of temperature changes in a given range for adapting the optical output performance of at least one laser (or several RGB lasers).

A red laser (with a wavelength of about 640 nm) may for example be provided, whose wavelength changes by about 0.25 nm per Kelvin due to the semiconductor material properties. With a blue laser (with a wavelength of about 440 nm) used as an example, the wavelength changes by about 0.05 nm per K due to the semiconductor material properties. Preferably, a green laser (with a wavelength of about 528 nm) may further be provided, whose wavelength is largely independent of temperature changes due to the arrangement with an intra cavity frequency doubling.

Figure 6:
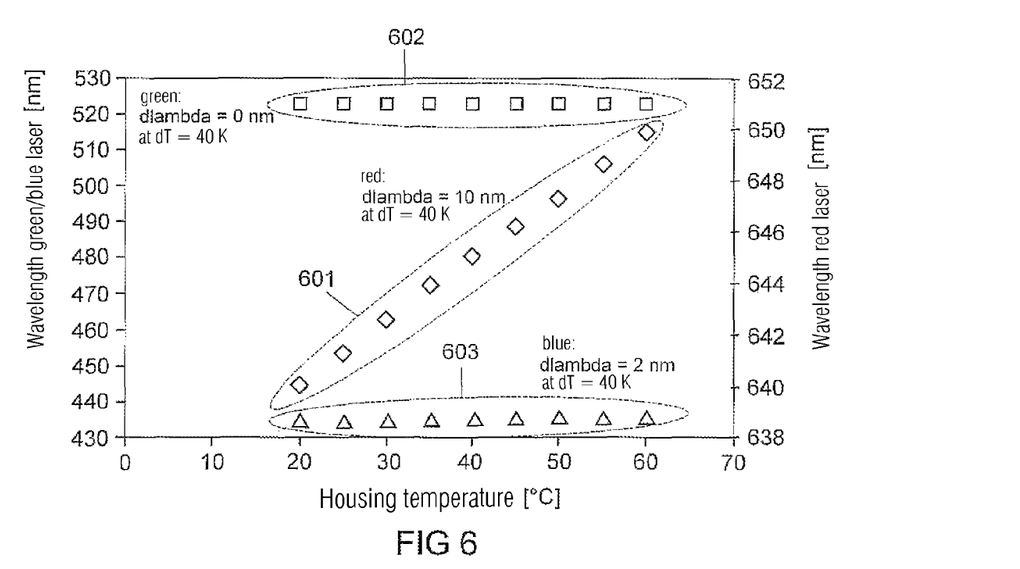
FIG. 6 shows a diagram with exemplary changes of the wavelengths for a red, a green and a blue laser in dependence on the temperature.

FIG. 6 shows changes of the wavelengths for the red laser 601, for the green laser 602 and for the red laser 603 in dependence on the temperature in an exemplary manner.

Due to the change of the laser wavelengths with the temperature, the tristimulus values of the RGB lasers change according to the color matching functions. Values for the color matching functions may e.g. be taken from the literature in a table form.

The tristimulus values of the resulting white light may thus be determined by the addition of the RGB tristimulus values:

$$TX\_w = TX\_R + TX\_G + TX\_B$$

$$TY\_w = TY\_R + TY\_G + TY\_B$$

$$TZ\_w = TZ\_R + TZ\_G + TZ\_B$$

CIE color coordinates x, y of the white light result from $$x = TX/(TX+TY+TZ) \text{ and}$$

$$y = TXY/(TX+TY+TZ)$$

Figure 7:
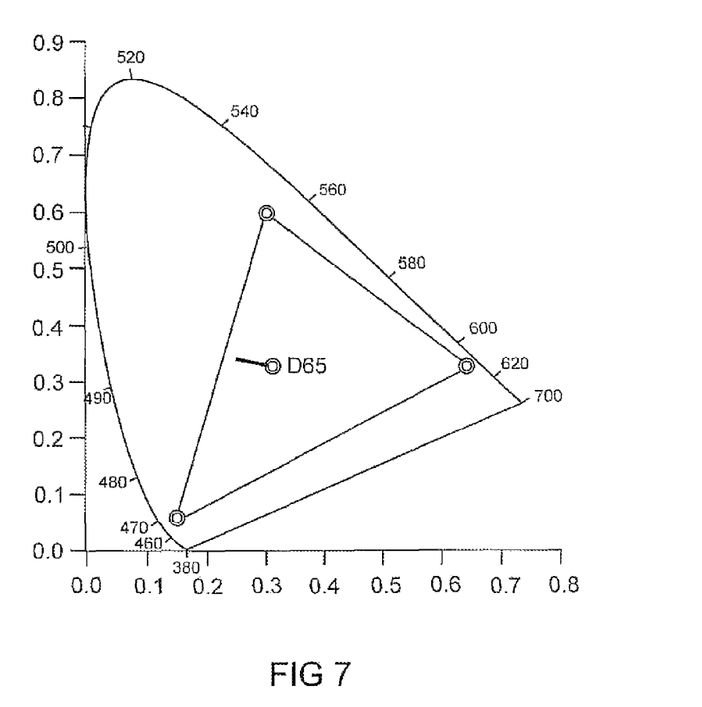
FIG. 7 shows a CIE standard color table for illustrating a color location change of an illuminant in the direction of turquoise.

FIG. 7 shows the color location change of the white light calculated from the above-mentioned formulas with the boundary condition that the optical output performance of the RGB lasers is kept essentially constant. Due to the temperature-dependent drift of the wavelengths shown in FIG. 2, the color impression from the original white (e.g. D65) (in the calibrated state) changes to turquoise.

This change of the illuminant color location occurs e.g. at temperature changes in a range of 20° C. to 60° C. This corresponds to a typical temperature in the housings of the laser components.

A distance in the color space between the color location in the calibrated state (e.g. D65) and in a state of increased temperature is a plurality of the maximum distance between two color locations that are perceived by the human eye as different colors defined by MacAdams without the compensation introduced here. The approach introduced here thus makes it possible, for example, to keep the temperature drift of the lasers within the MacAdams distance and thus a color-true reproduction of image contents.

Due to the linear superposition of color impressions it is possible to calculate that RGB laser performance, with which the above-mentioned color location can be reduced or compensated:

$$[w] = [TX\_w; TY\_w; TZ\_w] != !=$$
$$PR(T) * [TX\_R(\lambda\_R(T)); TY(\lambda\_R(T))\_R; TZ\_R(\lambda\_R(T))] ++$$
$$PG(T) * [TX\_G; TY\_G; TZ\_G] ++ PB(T) * [TX\_B(\lambda\_B(T));$$
$$TY\_B(\lambda\_B(T)); TZ\_B(\lambda\_B(T))] = := :$$
$$A * [PR(T); PG(T); PB(T)] \leftrightarrow [PR(T); PG(T); PB(T)] =$$
$$A^{\wedge}(-1) * [TX\_w; TY\_w; TZ\_w] != [\text{e.g. } D65]$$

Figure 8:
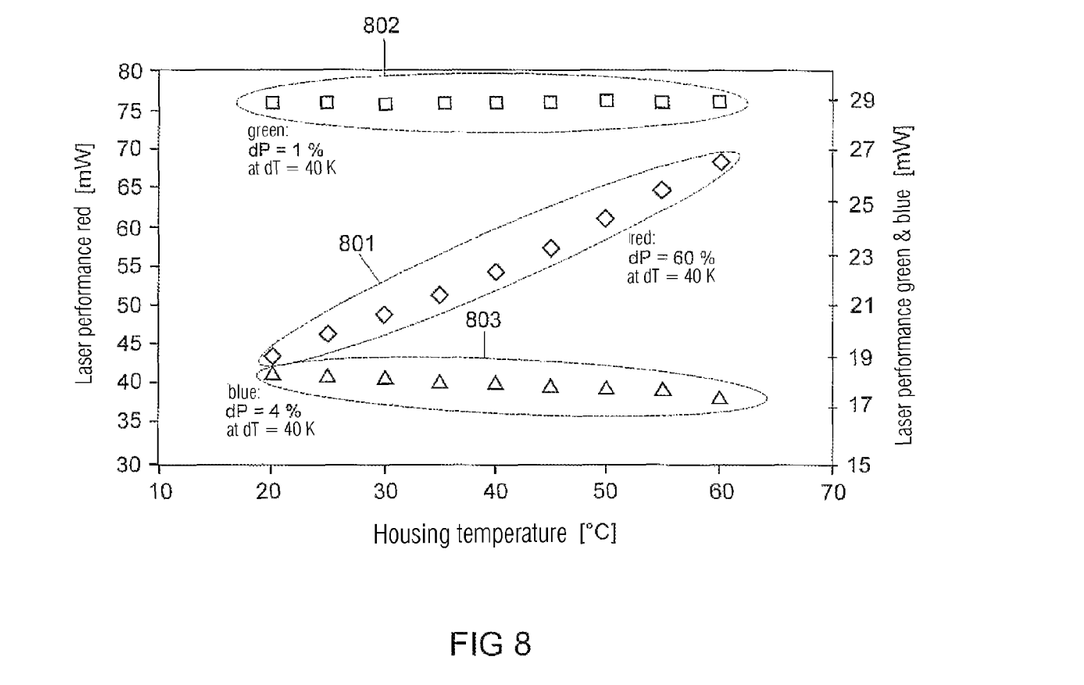
FIG. 8 shows a diagram with exemplary laser performances for a red, a green and a blue laser in dependence on the temperature.

The performances resulting from this (for 20 lumens at e.g. D65 and with a housing temperature in a region of 20° C. to 60° C. are shown in FIG. 8 for the red laser 801, for the green laser 802 and for the blue laser 803 in dependence on the temperature.

It shows, correspondingly, that an adaptation of the performances for each laser is different, in order to achieve a stable illuminant over a certain temperature range.

Three independent regulator circuits can advantageously be used, in order to realize the above-mentioned performance adaptations by use of special filter functions in a sufficiently good approximation.

These regulator circuits can be expressed by the following equations:

$$P\_R(\lambda\_R(T))*f\_R(\lambda\_R(T))=\text{constant}=S\_R(Tcal)$$

$$P\_G(\lambda\_G(T))*f\_G(\lambda\_G(T))=\text{constant}=S\_G(Tcal)$$

$$P\_B(\lambda\_B(T))*f\_B(\lambda\_B(T))=\text{constant}=S\_B(Tcal)$$

wherein P_R, P_G, P_B are the actuating variables and S_R (Tcal), S_G(Tcal), S_B(Tcal) the regulation variables.

The value of the respective regulation variable results from the calibration of the illuminant at the temperature Tcal.

The functions f_R(λ_R(T)), f_G(λ_G(T)), f_B(λ_B(T)) can be designed as special filter functions.

The filter functions may in particular be chosen in such a manner that the adaptation of the RGB laser performances shown in FIG. 8 is achieved in a sufficiently good approximation with an active regulation.

Such an approximation can be achieved if the current color location of the illuminant is above the exemplary range of 20° C. to 60° C. despite temperature changes within an ellipse e.g. with a 5-fold axis length of the corresponding MacAdams ellipse around the color location of the calibrated illuminant. A color-true reproduction of image information may thus be achieved with the invention, even with changes of the ambient temperature.

Further Exemplary Embodiments:

The following embodiments represent examples, which may possibly be combined with the above explanations or at least parts thereof.

Figure 9:
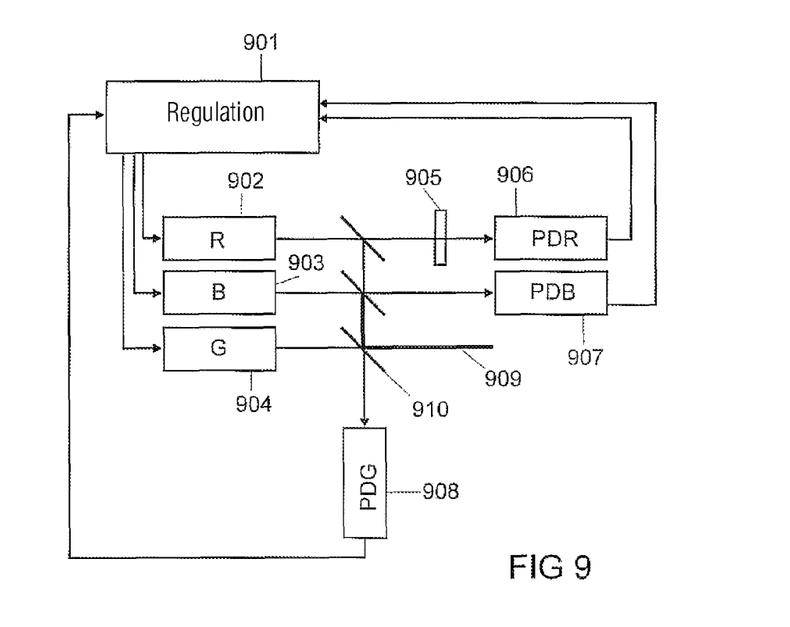
FIG. 9 shows a block diagram for adjusting and regulating to a virtually constant color point, wherein each beam of a RGB light source is detected with an inherent photo diode and the RGB light source is actuated by means of the RGB signals determined by means of the photo diodes, wherein an optical filter is additionally arranged in the red light beam in front of the photo diode.

FIG. 9 shows a block diagram for an exemplary embodiment, where the filter function is realized as an optical transmission filter.

A RGB laser module comprises a red laser diode 902, a blue laser diode 903 and a largely temperature-independent green laser 904. The green laser 904 emits a green light beam, which is deflected from a three-fold beam combination mirror 910 with a certain transmission and reflection on the one hand to a photo diode PD G 908 for green light and is combined to a spatially superposed RGB laser beam 906 on the other hand. The blue laser diode 903 emits a blue laser beam, which is supplied to the beam combination mirror 910 and thus to the RGB laser beam 909 on the one hand, deflected to a photo diode PD B 907 for blue light on the other hand. The red laser diode 902 emits a red laser beam, which is supplied to the beam combination mirror 910 and thus to the RGB laser beam 909 on the one hand, is guided to the photo diode PD R 906 for red light on the other hand.

The filter 905 may particularly be arranged in a light beam or several light beams of the RGB laser module. Each light beam can particularly have a separate filter. The filter 905 is preferably a filter which permits a wavelength-dependent transmission. The filter 905 is thus e.g. a V lambda filter, a transmission filter or an absorption filter.

It is particularly possible that the filter 905 is provided in the light beam having the highest temperature drift.

An exemplary embodiment for the filter 905 consists in that it is designed in such a manner that at least one further dependence of the color location on the wavelength is considered for at least one further light source. Thus, for the filter 905 arranged in the red beam path, a corresponding drift of the blue (and/or green) light may for example also be considered in an efficient manner in a certain approximation by means of the drift of the red light. Thus, the regulation may only be supplied with information by means of only one single filter 905 in front of the photo diode PD R 906, which enable an actuation not only of the red laser 902, but also of the blue laser 903 or the green laser 904. The sensors 907 and 908 and the effort connected therewith may correspondingly be omitted in such an exemplary embodiment.

The filter 905 may correspondingly be designed as a V lambda filter, by means of which a brightness sensitivity is for example only determined in one beam path and the brightnesses for a part or for all lasers are adjusted in dependence on a change by means of the regulation 901.

Respectively electrically pumped semiconductor lasers (diode lasers) may particularly be used for the red or blue light beam. A red diode laser has for example a wavelength drift of 0.25 nm/K and a blue diode laser a wavelength drift of 0.05 nm/K. An optically pumped infrared semiconductor laser with intra cavity frequency doubling can be used for generating the green radiation part. Such an infrared semiconductor laser is largely independent of temperature, that is, it does not show any significant change of the emitted wavelength over temperature.

The regulation 901 may for example be designed in the form of an ASIC. The light beams emitted by the individual lasers 902 to 904 may generally be detected via arbitrary sensors, particularly via the shown photo diodes 906 to 908. In addition to the change of the wavelength, a change of the brightness may also be detected and be (at least partially) compensated by means of the regulation 901. The regulation 901 may adjust the respective laser current or the respective laser performance in such a manner that the photo current of the photo diodes is essentially constant.

For example, separate filters (not shown) may be provided for the green laser 904 and for the blue laser 903, if a separate determination of the change of the wavelength should be determined here separately and/or (at least partially) compensated.

In the example according to FIG. 9, the filter functions for the green and the blue light beam can be set as constant in a defined spectral range, that is, f_G (λ_G)=constant (that is, the regulation realizes a constant output performance)

f_B (λ_B)=constant (that is, the regulation realizes a constant output performance).

The filter function f_R[λ_R(T)) for the red light beam may be realized as an optical transmission filter, that is, depending on the wavelength, a different amount of light impinges the photo diode 906. The transmission may particularly depend on the wavelength in a linear manner:

$$f\_R([\lambda]\_R)=TrO*(1-([\text{lambda}]\_R-[\lambda\_R\_0)*s)$$

The effect of changes of the ambient temperature on the parameters optical performance and wavelength relevant for the color mixing may thus be detected by the actuation electronics and be compensated (at least partially) correspondingly.

The value TrO gives the transmission of the filter at the reference wavelength λ_R. TrO should preferably be dimensioned in dependence on the sensitivity of the respective photo diode.

It is thus, for example, possible to stabilize the color location drift of the illuminant with a deviation from a target color location (e.g. D65) in the CIE color space.

A criterion as to whether the deviation is visible to the human eye may be determined by the position of the current illuminant color location relative to the MacAdams ellipse around the reference illuminant (e.g. D65). Color locations, which lie within an ellipse with for example the 5-fold length of the semiaxes of the MacAdams ellipse, are perceived by the human eye as identical to the reference illuminant. This may thus be used on the measure based on the MacAdams ellipse, in order to permit a certain tolerance for a color drift. Corresponding to a respectively required exactness, a more or less stable illuminant may be preset in dependence on the application and/or the quality of a product. The regulation or the necessary components in connection with the regulation with regard to effort and thus costs may be scaled.

The value range for the above-mentioned parameter s of the transmission filter may preferably be chosen in such a manner that the above-mentioned MacAdams criterion is fulfilled. The parameter s may e.g. be preset within an interval [4%; 4.8%] per nm for this.

Figure 10:
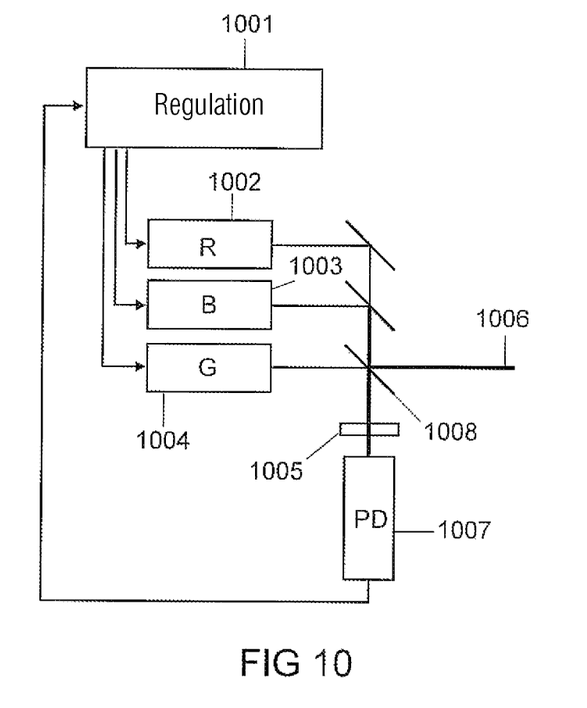
FIG. 10 shows a block diagram of an alternative adjustment and regulation to a virtually constant color point, wherein the RGB signal of a RGB light source is also detected via a filter by means of a photo diode and the three light sources are actuated by means of the signal of the photo diode.

FIG. 10 shows a further block diagram for an exemplary embodiment, where the filter function is realized as an optical transmission filter, wherein only a single photo diode is used in contrast to FIG. 9.

An RGB laser module includes a red laser diode 1002, a blue laser diode 1003 and a largely temperature-independent green laser 1004. The green laser emits a green light beam, which is deflected to a photo diode PD 1007 from a three-fold beam combination mirror 1008 with a certain transmission and reflection on the one hand, and is combined to a spatially superposed RGB laser beam 1006 on the other hand. The blue laser diode 1003 emits a blue laser beam, which is supplied to the beam combination mirror 1008 and thus to the RGB laser beam 1006 and to the photo diode PD 1007 via a mirror. The red laser diode 1002 emits a red laser beam, which is supplied to the beam combination mirror 1008 and thus to the RGB laser beam 1006 and to the photo diode PD 1007 via a mirror.

A filter 1005 is arranged in front of the photo diode 1007, which may in particular be a V lambda filter, a transmission filter or an absorption filter. The signal detected by the photo diode is guided to a regulator 1001, which consequently actuates the laser diodes 1002, 1003 and the laser 104.

Figure 11:
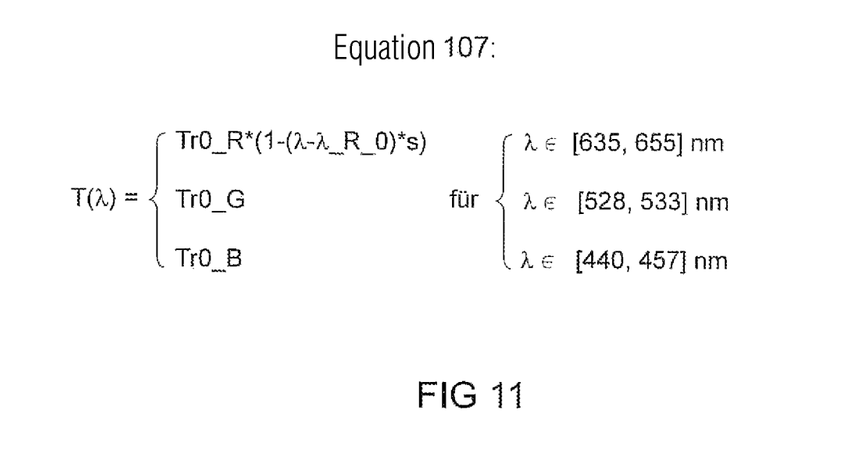
FIG. 11 shows an equation 108 for describing a wavelength-dependent transmission.

The filter 1005 may particularly be an optical transmission filter, which has a wavelength-dependent transmission e.g. according to equation 108 (see FIG. 11).

The optical transmission filter may thereby be designed in such a manner that it realizes the above-mentioned function of the wavelength in the three wavelength ranges red, green and blue. The regulation of the individual RGB lasers may take place sequentially, that is, the photo diode signal is read out by the access electronics (ASIC) color for color and the performance of the corresponding laser is adapted.

It is also possible that the photo diodes of the red and the blue laser are positioned in the vicinity of the laser rear facet and that the laser rear facet performance is thus detected. An optical performance is determined from the rear facet of the laser, whose value is proportional to the performance emitted from the front facet of the laser. This arrangement enables a more compact design of the RGB laser module.

The filter function may be realized as a reflecting and/or as an absorbing optical layer.

The values for TrO_R, TRO_G, TRO_B may be realized in the technical implementation of the filter as a neutral density filter (e.g. as an additional optical component), or as an integrated solution together with the wavelength-dependent part of the filter.

The approach introduced here is valid for arbitrary color points, particularly illuminants, in the color space. As the size of the MacAdams ellipses varies in dependence on the position of the chosen color point in the color space, the tolerance for the filter inclination s can be adapted correspondingly.

Further Advantages:

The approach introduced here enables the use of a regulation with a wavelength-dependent filter function in the regulator circuit while considering the brightness sensation of the human eye at different wavelengths. This enables improved illuminant stability.

Another advantage consists in that the introduced solution enables an efficient and cost-effective implementation. The costs for otherwise elaborate and complex actuation electronics can be reduced in particular.

It is also advantageous that no separate temperature measurement is required.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A method for adjusting the color point of a lighting unit comprising semiconductor-based lasers for generating an RGB signal, the method comprising:
    supplying at least one component of the RGB signal a sensor via a filter; and
    actuating at least one of the semiconductor-based lasers is by means of a signal detected by the sensor,
    wherein a plurality of semiconductor-based lasers are actuated sequentially by means of the respectively associated detected signal,
    wherein the adjusting of the color point lies within the scope of a given tolerance,
    wherein the given tolerance is determined by means of a MacAdams distance,
    wherein the lighting unit comprises a red semiconductor-based laser, a green semiconductor-based laser and a blue semiconductor-based laser,
    wherein the green semiconductor-based laser is an optically pumped infrared semiconductor laser with a frequency doubling.

2. The method as claimed in claim 1, wherein a plurality of components of the RGB signal are respectively supplied to a sensor and the at least one semiconductor-based laser is actuated by means of the signal detected by the respective signal.

3. The method as claimed in claim 1, wherein a plurality of filters are provided for a plurality of components of the RGB signal.

4. The method as claimed in claim 1, wherein the sensor comprises a photo diode.

5. The method as claimed in claim 1, wherein a regulation for the actuation of the at least one semiconductor-based laser is provided.

6. The method as claimed in claim 1, wherein the adjusting of the color point comprises an adjusting of an illuminant or an illuminant adjustment or an illuminant regulation.

7. The method as claimed in claim 1, wherein the filter comprises one of the following filters: a V lambda filter; an absorption filter; a transmission filter.

8. The method as claimed in claim 1, wherein the filter is designed in such a manner that at least one further dependence of a color location on a wavelength of at least another light source is considered.

9. The method as claimed in claim 1, wherein the filter is designed for a given wavelength range.

10. A device for adjusting the color point of a lighting unit, the device comprising: semiconductor-based lasers for generating an RGB signal, at least one filter, via which the at least one component of the RGB signal of at least one sensor can be supplied to at least one sensor, and a regulation, which actuates at least one of the semiconductor-based lasers by means of a signal detected by the sensor,     wherein a plurality of semiconductor-based lasers are actuated sequentially by means of the respectively associated detected signal,     wherein the adjusting of the color point lies within the scope of a given tolerance,     wherein the given tolerance is determined by means of a MacAdams distance,     wherein the device further comprises a red semiconductor-based laser, a green semiconductor-based laser and a blue semiconductor-based laser,     wherein the green semiconductor-based laser is an optically pumped infrared semiconductor laser with a frequency doubling.

11. A device for the actuation of at least one semiconductor-based laser with at least one of a processor unit and an at least partially wired or logical circuit arrangement, which is arranged in such a manner that a method for adjusting the color point of a lighting unit comprising semiconductor-based lasers for generating an RGB signal can be carried out, the method comprising: supplying at least one component of the RGB signal to a sensor via a filter; and actuating at least one of the semiconductor-based lasers by means of a signal detected by the sensor, wherein a plurality of semiconductor-based lasers are actuated sequentially by means of the respectively associated detected signal,     wherein the adjusting of the color point lies within the scope of a given tolerance,     wherein the given tolerance is determined by means of a MacAdams distance,     wherein the device further comprises a red semiconductor-based laser, a green semiconductor-based laser and a blue semiconductor-based laser,     wherein the green semiconductor-based laser is an optically pumped infrared semiconductor laser with a frequency doubling.

12. The method as claimed in claim 4, wherein the photo diode is arranged in the vicinity of a laser rear facet.

13. The method as claimed in claim 9, wherein the filter is designed for a given wavelength range in a visible spectrum.

* * * * *